United States Patent [19]
Shaffer

[11] 3,958,617
[45] May 25, 1976

[54] CONNECTOR FOR CHAINS
[75] Inventor: Christ N. Shaffer, Great Falls, Mont.
[73] Assignee: American Chain & Cable Company, Inc., Bridgeport, Conn.
[22] Filed: Nov. 15, 1974
[21] Appl. No.: 524,326

[52] U.S. Cl. .................................. 152/241; 59/93; 152/233
[51] Int. Cl.² ......................................... B60C 27/00
[58] Field of Search ........... 152/241, 242, 233, 223, 152/221, 222, 225, 235; 85/8.8, 5, 7, 36; 59/93

[56] References Cited
UNITED STATES PATENTS

| | | | |
|---|---|---|---|
| 1,339,979 | 5/1920 | Reyburn | 152/242 |
| 2,438,248 | 3/1948 | Madison | 152/241 |
| 2,444,462 | 7/1948 | Morton | 152/242 |
| 2,894,425 | 7/1959 | Rapata | 85/8.8 |
| 2,995,889 | 8/1961 | Johnson | 59/93 |
| 3,069,962 | 12/1962 | Rapata | 85/8.8 |
| 3,357,292 | 12/1967 | Falkenberg | 85/8.8 |

*Primary Examiner*—Drayton E. Hoffman
*Attorney, Agent, or Firm*—Pennie & Edmonds

[57] ABSTRACT

A connector element for securement of one chain member including a plurality of links to a second chain member also including a plurality of links is disclosed. The connector element includes a pin portion and opposed head portions at the ends which define with the pin a pair of spaced shoulders. One head is enlarged so that its shoulder engages with a link to prevent passage therethrough. The other head may be received through the link and receives a deformable member thereover to cooperate with its shoulder. The member is of a size to cooperate with the link and prevent passage of the connector element in the other direction.

7 Claims, 3 Drawing Figures

CONNECTOR FOR CHAINS

BACKGROUND OF THE INVENTION

Chains for use as tire chains are and have been known to the art for quite some time. Throughout this period there have been some developments in connection with the chain members themselves but, primarily, the developments have been directed to forms of connector devices for securing one or more cross chain members to a pair of side chain members.

Representative of patents illustrating tire chain and connector constructions are U.S. Pat. Nos. 1,339,979 to Reyburn and 2,444,462 to Morton. These patents generally disclose rather complex constructions for securement of a cross chain member to a side chain member. More particularly, the former patent relates to a connector which is received through a connecting link after the latter is passed through a holding link. The connector requires mechanical means in the form of a screw threaded into the connector to prevent release from the connecting link by interaction of the screw head and shank and the link. The connector prevents the retraction of the connecting link from the interlocked holding link. The latter patent illustrates a plurality of intercooperating structures including a plurality of flat links forming a part of and spaced around the side chain member and a plate on each end of each cross chain member. The plate provides a bar which is spaced from but generally parallel to the plate. Each flat link includes an aperture extending in the direction of the link and complementary to the bar in outline. The cross chain members may be secured to the side chain members upon receipt of the bar through the aperture and rotation of the plate through an angle of about 90°.

As can be appreciated, both patents relate to rather complex structural arrangements for securement purposes. Further, the former patent requires tools, such as a screwdriver for securement of chain members; whereas, the latter patent while disclosing hand manipulated components permits the mounting of cross chain members only in those locations at which a flat link may be provided.

BRIEF DESCRIPTION OF THE INVENTION

The present invention seeks to overcome the problems of the prior art and provides a simplified connector element for securement of cross chain members to side chain members with relative ease and without resort to any tools for manipulative purposes. Further, the connector element of the present invention permits that the several cross chain members may be secured to the side chain members at various circumferential locations, as desired.

In an important aspect the connector element of the present invention includes a pin with opposed head portions. The head portions describe circumferential shoulders around the pin. One of the heads is of a size to prevent passage through a link of a chain; whereas, the other head is adapted to be received through the link of the chain. A locking means is adapted to be received in one direction over the other head and secured by the shoulder against movement in the other direction. The locking means is configured so that it will not move through the link.

In a second aspect the present invention contemplates that the head which is adapted to pass through the link be of conical outline and that the locking means received thereover be of elastomeric make-up with an aperture. The locking means distorts upon movement in one direction over the head. The aperture returns to normal outline after the locking means passes over the head and the locking means cooperates with the shoulder.

In operation, a link of a cross chain member is passed through from one side to the other a link of a side chain member. The small head and a portion of the pin length of a connector element having a large head at the other end is received through the cross chain link on the other side of the side chain member. A locking means is received over the smaller head. The locking means has an enlarged body and with the larger head restrains movement of the connector element in either direction and consequently withdrawal of the cross chain link from the side chain link.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized as a basis for the designing of other structures for carrying out the several purposes of the invention. It is important, therefore, that the claims be regarded as including such equivalent construction as do not depart from the spirit and scope of the invention.

DESCRIPTION OF THE PREFERRED EMBODIMENT

Figure 3:
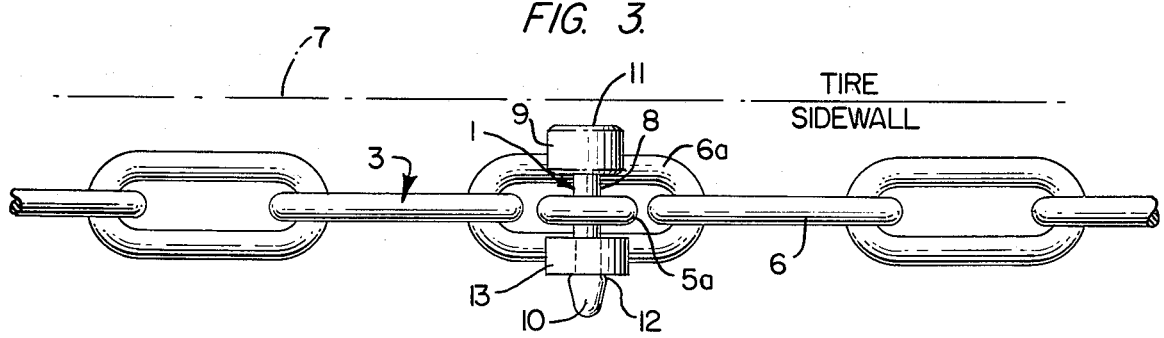

The connector element 1 seen to best advantage in FIG. 3 has adaptation to many applications wherein there is requirement of securement of the link of one chain section to a link of a second chain section. The connector element lends itself particularly well and will be described herein as being adapted for use with various chain members comprising a snow chain. To this end, the connector element is used in securing one of a plurality of cross chain members 2 to a pair of side chain members 3 (only one is shown).

Each cross chain member includes a plurality of individual metal links 5, each of which may take the form of a flat, twisted or twisted reinforced link construction. Preferably, the links 5 will be of twisted construction, of tear drop outline. This form of link assists in gripping action with the snow for enhancement of traction.

Each side chain member likewise includes a plurality of individual metal links 6, each of which preferably are flat and of relatively long, narrow shape. All of the links 5 and 6 conventionally are formed of steel or other suitable stock material.

Figure 1:
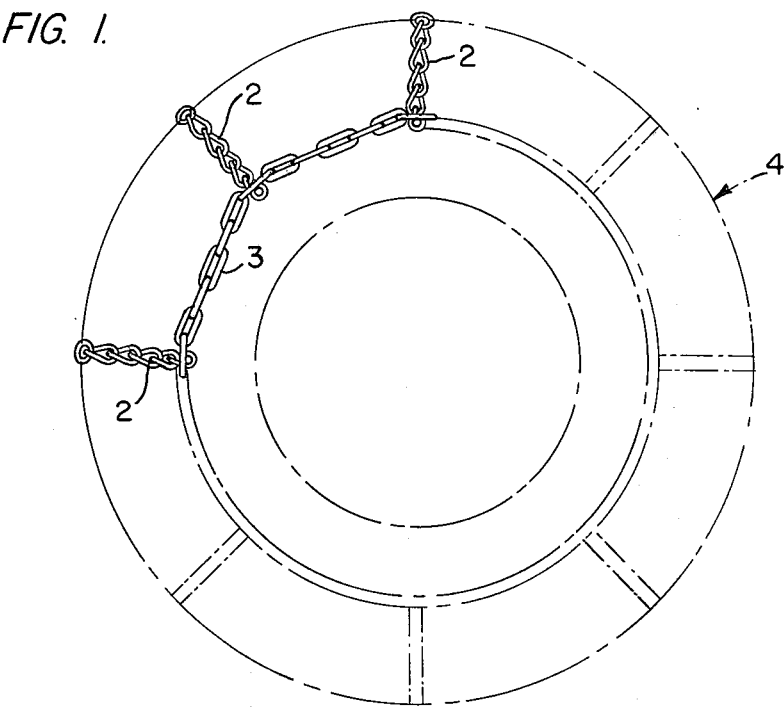
FIG. 1 is a diagrammatic elevational view of a vehicle tire illustrating the manner of mounting side and cross chain components, and a connector for securing the components on the tire.

The side chain members 3 are disposed to extend circumferentially around tire 4 in the region of the side wall 7 of the tire. The cross chain members 2 extend from one side chain member to the other side chain member across the tread of the tire (see FIG. 1). The several cross chain members are disposed in parallel relation each to the others across the tire tread. The cross chain members may be disposed in equidistantly spaced relation as shown in FIG. 1, or the cross chain members may be grouped in clusters of two or more, for example, at equal spacing around the circumference of the tire. As should be apparent, both chain members will be formed of required number of metal links for the particular size of tire with which the snow chain is to be used.

The connector element 1 permits relatively rapid securement of the cross chain members to and release of the cross chain members from the side chain members without resort to use of tools. And, the connector makes relatively easy, at all locations, repair of the snow chain without resort to removal of the snow chain from the tire. By use of the connector element a non-swivel securement of the cross chain members on the side chain members may be carried out.

The connector element includes a pin 8 having a head 9 at one end and a head 10 at the other end. The connector element may be formed as an integral unit or else the heads may be received on and by conventional structure secured to the pin. In the present invention good results have been achieved through the use of an integral unit. The head 9 may be of a shape to provide a flat surface 11 and an opposed shoulder around the pin. As illustrated, the head 9 is of cylindrical outline and is enlarged so that it is prevented from passing through any one of the links. The head 10 is of smaller outline and is capable of passing through one of the links. The head 10 preferably has a conical outline having a blunted spherical end for reasons as will become apparent. The spherical end of the head is removed from a shoulder 12 which faces the head 9.

Figure 2:
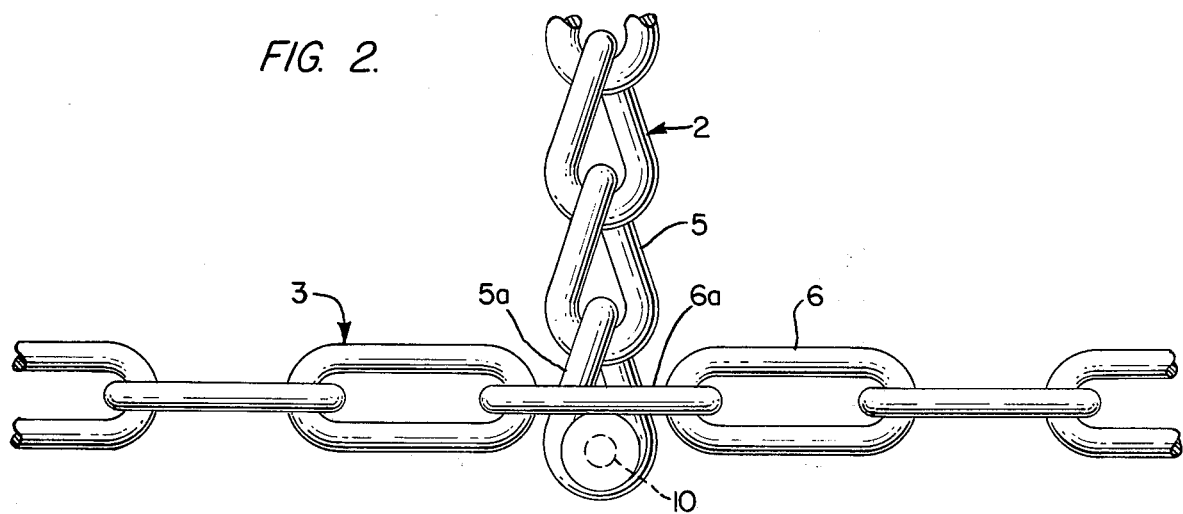
FIG. 2 is a view of several links of each of the side and cross chains, and the securing connector; and, FIG. 3 is a view similar to yet illustrating the components of FIG. 2 through an angle of 90°.

In securing the cross chain members to the side chain members a link 5a of the former, which may be an end link, is received through a link 6a of the latter so that the bulbous end is in the FIG. 2 diposition. The connector element including the head 10 and a portion of the length of pin 8 is passed through the bulbous end to one side of the link 5a. The head 9 remains on the other side of link 5a. A locking means is received on and secures the connector element 1 in this position.

The locking means is formed of resilient material such as an elastomeric cylindrical block providing an aperture having a diameter substantially equal to the outer diameter of pin 8. The elastomeric material should be substantially incompressible yet capable of stretching and of returning through its memory to the normal relaxed shape. Thus, the locking means may be formed of rubber or any one of the well-known synthetics, such as isoprene and neoprene to name a few. A locking means formed of neoprene has been used successfully and is preferred.

The locking means is forced over the head 10 by the camming action of the conical wall. The locking means "locks" upon return to the relaxed shape against the shoulder 12 for securement of the several cross chain members to the side chain members. The locking means 13 is of a size so that it cannot be pulled through link 5a to the other side. Movement of the pin in this direction also is impeded by the head 9 which cooperates through the flat surface 11 with the tire wall 7.

The degree of securement of the element has been found to prevent accidental "unlocking" of the chain member during practical use.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

Having described the invention, what is claimed is:

1. In combination, with a tire chain including a pair of circumferentially disposed side chain members adapted to lie against the opposite side walls of the tire with at least some links lying in planes which intersect the side walls of the tire, and at least one cross chain member, a connector element adapted for non-swivel securing connection of a link of each cross chain member to one of said links of each side chain member when the former is received through the latter from one side to the other, said connector comprising:
    a. an elongated pin;
        1. a first head carried at one end of said pin,
        2. a second head carried at the opposite end of said pin,
        3. both of said heads forming a circumferential shoulder with said pin,
        4. said first head having an enlarged body to prevent passage through said link of said cross chain member and being adapted to be disposed between the link of the side chain member through which it is received and the adjacent side wall of the tire for engagement thereby, and
        5. said second head having a body adapted to pass through said link of the cross chain; and
    b. a locking means received over said second head to engage with said shoulder, said locking means having:
        1. an enlarged body to prevent withdrawal of said second head through said link of the cross chain member and to maintain said last mentioned link in said received position.

2. The combination of claim 1 wherein:
    a. said second head body includes a substantially conical wall; and
    b. said body of said locking means is formed of deformable material.

3. The combination of claim 2 wherein:
    a. said locking means body has an aperture, said locking means body being cammed over said conical wall into said shoulder engaging position.

4. The combination of claim 1 wherein:
    a. a plurality of cross chain members are secured to said side chain members.

5. The combination of claim 4 wherein:
    a. said plurality of cross chain members are secured equidistantly to said side chain members around said circumference.

6. The combination of claim 1 wherein:
    a. each link of said cross chain member is twisted to a tear drop outline.

7. The combination of claim 1 wherein:
    a. said locking means is formed of deformable material with an aperture through the enlarged body thereof for force fit over the second head of the pin and into shoulder engaging position;

b. said first head and locking means, when the latter is in said shoulder engaging position with the second head, being spaced from each other by a distance equal to the spacing between the side portions of the link of the side chain member through which the link of the cross chain member is received for engagement therewith.

* * * * *